(12) United States Patent
Ota et al.

(10) Patent No.: US 7,477,648 B2
(45) Date of Patent: Jan. 13, 2009

(54) PACKET FORWARDING APPARATUS AND ACCESS NETWORK SYSTEM

(75) Inventors: Migaku Ota, Yokohama (JP); Hiroaki Miyata, Yokohama (JP); Kengo Ijima, Yokohama (JP); Koji Ikeda, Fujisawa (JP); Daiki Nozue, Fujisawa (JP)

(73) Assignee: Hitachi Communication Technologies, Ltd., Tokyo (JP)

(*) Notice: Subject to any disclaimer, the term of this patent is extended or adjusted under 35 U.S.C. 154(b) by 640 days.

(21) Appl. No.: 11/037,114

(22) Filed: Jan. 19, 2005

(65) Prior Publication Data

US 2006/0062228 A1 Mar. 23, 2006

(30) Foreign Application Priority Data

Sep. 17, 2004 (JP) ............................ 2004-270950

(51) Int. Cl.
*H04L 12/28* (2006.01)
(52) U.S. Cl. ........................... 370/401; 370/352; 710/4; 709/226
(58) Field of Classification Search ........................ None
See application file for complete search history.

(56) References Cited

U.S. PATENT DOCUMENTS 6,427,170 B1* 7/2002 Sitaraman et al. ........... 709/226
7,197,549 B1* 3/2007 Salama et al. ............... 709/223
2006/0253896 A1* 11/2006 Sitaraman et al. ............. 726/2

FOREIGN PATENT DOCUMENTS

JP 2003-087299 3/2003

OTHER PUBLICATIONS

IETF RFC2865.

* cited by examiner

*Primary Examiner*—Duc C Ho
(74) *Attorney, Agent, or Firm*—Mattingly, Stanger, Malur & Brundidge, P.C.

(57) ABSTRACT

An access network system connected to an ISP network including a subscriber authentication server comprised of a plurality of packet forwarding apparatuses each for connecting user terminals to an Internet network via the ISP network and an address pool management server having an address pool management table for holding, as a sub-address pool, a plurality of IP addresses usable over the ISP network. Each of the packet forwarding apparatuses acquires from the address pool management server an IP address to be allocated to the user terminal having requested connection to the Internet when the subscriber authentication server has succeeded in authentication of the user terminal.

9 Claims, 14 Drawing Sheets

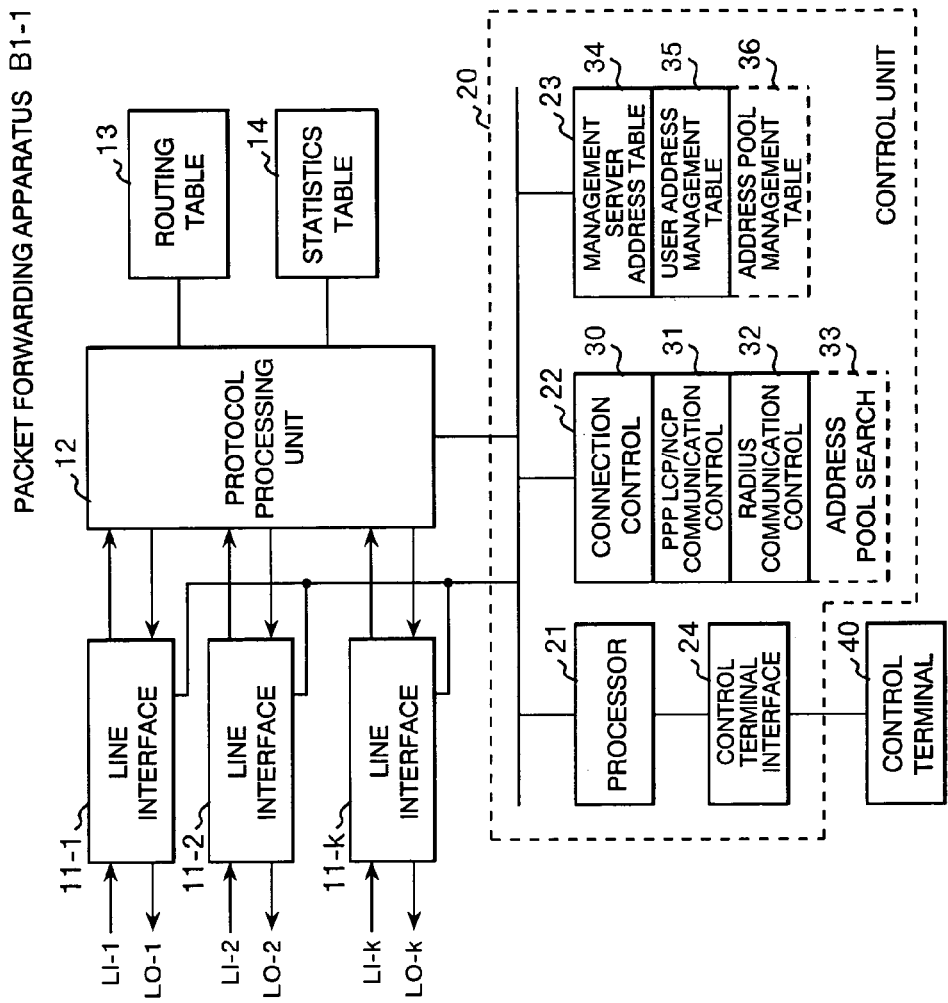

FIG. 3

MANAGEMENT SERVER ADDRESS TABLE 34

| ISP NAME | ADDRESS POOL MANAGEMENT SERVER ADDRESS |
|---|---|
| ISP 1 | 10.20.0.1 |
| ISP 2 | 10.20.0.2 |
| ... | ... |
| Default | 10.20.0.3 |

341 — ISP NAME column
342 — ADDRESS POOL MANAGEMENT SERVER ADDRESS column

USER ADDRESS MANAGEMENT TABLE 35

351 — USER ID, 352 — STATUS, 353 — DISTRIBUTED ADDRESS

FIG. 4A

| USER ID | STATUS | DISTRIBUTED ADDRESS |
|---|---|---|
| xxx@tokyo.ISP1 | DISTRIBUTED | 10.10.0.1 | ~350-1
| ... | ... | ... |

FIG. 4B

| USER ID | STATUS | DISTRIBUTED ADDRESS |
|---|---|---|
| xxx@tokyo.ISP1 | DISTRIBUTED | 10.10.0.1 | ~350-1
| yyy@tokyo.ISP1 | REQUESTING | | ~350-2
| ... | ... | ... |

FIG. 4C

| USER ID | STATUS | DISTRIBUTED ADDRESS |
|---|---|---|
| xxx@tokyo.ISP1 | DISTRIBUTED | 10.10.0.1 | ~350-1
| yyy@tokyo.ISP1 | WAITING | 10.10.0.52 | ~350-2
| ... | ... | ... |

FIG. 4D

| USER ID | STATUS | DISTRIBUTED ADDRESS |
|---|---|---|
| xxx@tokyo.ISP1 | DISTRIBUTED | 10.10.0.1 | ~350-1
| yyy@tokyo.ISP1 | DISTRIBUTED | 10.10.0.52 | ~350-2
| ... | ... | ... |

ADDRESS POOL MANAGEMENT TABLE 70

FIG. 6A

| DOMAIN NAME | ITEM NO. | IP ADDRESS | DESTINATION |
|---|---|---|---|
| ISP1 | 0 | 10.10.0.0 | INHIBITED |
| | 1 | 10.10.0.1 | xxx@tokyo.ISP1 |
| | 2 | 10.10.0.2 | zzz@tokyo.ISP1 |
| | ... | ... | ... |
| | 52 | 10.10.0.52 | IDLE |
| | ... | ... | ... |
| | 255 | 10.10.0.255 | INHIBITED |
| | ... | ... | ... |
| | 386 | 10.10.1.129 | ppp@osaka.ISP1 |
| | 387 | 10.10.1.130 | IDLE |
| | ... | ... | ... |
| | 1023 | 10.10.3.255 | INHIBITED |
| ISP3 | 0 | 210.10.0.0 | INHIBITED |
| | ... | ... | ... |

FIG. 6B

| DOMAIN NAME | ITEM NO. | IP ADDRESS | DESTINATION |
|---|---|---|---|
| ISP1 | 0 | 10.10.0.0 | INHIBITED |
| | 1 | 10.10.0.1 | xxx@tokyo.ISP1 |
| | 2 | 10.10.0.2 | zzz@tokyo.ISP1 |
| | ... | ... | ... |
| | 52 | 10.10.0.52 | yyy@tokyo.ISP1 |
| | ... | ... | ... |
| | 255 | 10.10.0.255 | INHIBITED |
| | ... | ... | ... |
| | 386 | 10.10.1.129 | ppp@osaka.ISP1 |
| | 387 | 10.10.1.130 | IDLE |
| | ... | ... | ... |
| | 1023 | 10.10.3.255 | INHIBITED |
| ISP3 | 0 | 210.10.0.0 | INHIBITED |
| | ... | ... | ... |

PACKET FORWARDING APPARATUS AND ACCESS NETWORK SYSTEM

CLAIM OF PRIORITY

The present application claims priority from Japanese application Ser. No. 2004-270950, filed on Sep. 17, 2004, the content of which is hereby incorporated by reference into this application.

BACKGROUND OF THE INVENTION (1) Field of the Invention

The present invention relates to a packet forwarding apparatus and an access network system for controlling an access from a user terminal to the Internet.

(2) Description of the Related Art

When user terminals use the Internet, each of the user terminals communicates with the subscriber authentication server of an Internet service provider (hereinafter abbreviated as ISP) to which the user is subscribed upon each connection to the Internet and receives an allocation of an IP (Internet Protocol) address. The user terminal performs packet communication with a target server on the Internet by using the foregoing IP address as a source address. Each of the user terminals is connected to the Internet via an ISP network managed by the ISP. Between the ISP network and the user terminal, there exists generally a network termed an access network provided by a carrier. The service of providing connection between the user terminal and the ISP network via the access network is implemented under a contract between the carrier and the ISP.

In the access network mentioned above, a plurality of packet forwarding apparatuses (hereinafter referred to as access servers) termed access servers or BASs (Broadband Access Servers) are generally provided. Each of the access servers accommodates a plurality of user terminals (subscriber terminals) subscribed to the ISP and controls the connection and disconnection of each of the user terminals to and from the Internet. Each of these access servers provides an area-by-area Internet connection service such as a server for subscriber terminals located in the Tokyo district, a server for subscriber terminals located in the Nagoya district, or a server for subscriber terminals located in the Osaka district.

In such a network structure, the allocation of an IP address to a user terminal (IP address distribution) is performed in accordance with the following two methods, as shown in, e.g., Japanese Unexamined Patent Publication No. 2003-087299.

In accordance with the first IP address allocation method, a group of IP addresses (hereinafter, the group of addresses will be referred to as an address pool) to be distributed to user terminals are managed by a subscriber authentication server located in the ISP network, e.g., a Radius (Remote Authentication Dial In User Service) server. When an access server received an Internet connection request from a user terminal and transmitted an authentication request message (Access-Request) to the subscriber authentication server to determine whether the user terminal should be connected to the Internet, the subscriber authentication server specifies an IP address to be allocated to the user terminal in a response message (Access-Accept) issued in response to the authentication request. According to the method, it is necessary for the ISP subscriber authentication server to manage whether or not each of IP addresses registered in the address pool has been allocated to a user terminal. This causes the problem of increased load on the subscriber authentication server because a process of updating address status information in the address pool occurs every time a user terminal is connected/disconnected to or from the Internet.

In accordance with the second IP address allocation method, the ISP entrusts to the carrier (access server) actual allocation of an IP address to a user terminal and actual status management of the IP address. The IP addresses registered in the address pool of the ISP are divided preliminarily into a plurality of address groups corresponding to access servers such that each of the access servers performs the allocation of an IP address to a user terminal within the limits of the address group (hereinafter referred to as a sub-address pool) entrusted thereto by the ISP.

In accordance with the Radius protocol, as described at, e.g., page 33 in RFC 2865, a Radius server can instruct an access server (NAS: Network Access Server) to allocate an IP address from a sub-address pool held therein to a user terminal by setting a fixed value "255.255.255.254" to the address field of a Framed-IP-Address attribute when the Radius server specifies an IP address to be allocated to a terminal by a response message (Access-Accept) issued in response to an authentication request. Since the allocation of IP addresses to terminals that have succeeded in user authentication and the management of the IP addresses are distributed to a plurality of access servers, the second IP address allocation method can reduce the load on the subscriber authentication server.

In accordance with the second conventional IP address allocation method described above, however, the IP addresses preserved in the address pool of the ISP have been divided into the plurality of address groups (sub-address pools) and the management of the IP addresses has been entrusted to each of the access servers in units of address-group. This leads to the problem that, when Internet connection requests from a large number of user terminals are concentrated on a specified one of the access servers, the specified access server comes short of the IP addresses irrespective of the presence of a sufficient number of IP addresses in the entire ISP.

For example, the case is assumed where three access servers for the Tokyo district, the Nagoya district, and the Osaka district exist in the access network and the ISP has entrusted the access server for the Tokyo district with the allocation of the 256 IP addresses "10.10.0.0" to "10.10.0.255" to user terminals and the status management thereof, the access server for the Nagoya district with the allocation of the 256 IP addresses "10.10.1.0" to "10.10.1.255" to user terminals and the status management thereof, and the access server for the Osaka district with the allocation of the 256 IP addresses "10.10.2.0" to "10.10.2.255" to user terminals and the status management thereof.

If it is assumed here that Internet connection requests have issued from the total of 650 users including 300 users in the Tokyo district, 150 users in the Nagoya district, and 200 users in the Osaka district in a specified time zone, the situation occurs in which the access server for the Tokyo district comes short of idle IP addresses and some of the users cannot be provided with the Internet connection service irrespective of the total of 768 distributed IP addresses entrusted by the ISP to the carrier which is larger than the total number of the connection requests.

SUMMARY OF THE INVENTION

With the conventional technology, it is difficult to effectively use a limited number of IP addresses possessed by the ISP. Accordingly, when a specified access server comes short of IP addresses, the carrier has to perform a procedure for changing the range of the sub-address pool allocated to the access server between the carrier and the ISP.

It is therefore an object of the present invention to provide a packet forwarding apparatus and an access network system that allow effective use of groups of IP addresses possessed by the ISP.

To attain the object, the feature of the present invention resides in that an address pool management server for managing sub-address pool is provided in an access network and each of access servers (packet forwarding apparatuses) in the access network acquires an IP address to be allocated to an authenticated user terminal from the address pool management server.

More specifically, according to the present invention, a packet forwarding apparatus, which is located in an access network connected to an Internet service provider (ISP) network including a subscriber authentication server, for connecting a plurality of user terminals to an Internet network via the ISP network comprises a plurality of line interfaces each coupled to one of the user terminals or to the ISP network through connection lines, a control unit, and a protocol processing unit for exchanging received packets among the line interfaces and the control unit. The control unit comprises: a user address management table for storing a plurality of table entries each indicating a relationship between an identifier of one of the user terminals and an IP address allocated thereto; inter-server communication control means for executing, for each of the user terminals that has requested connection to the Internet, an authentication procedure between the user terminal and the subscriber authentication server, requesting an IP address to be allocated to the user terminal from an address pool management server located in the access network when an authentication response packet instructing to use a sub-address pool was received from the subscriber authentication server, and storing the IP address acquired from the address pool management server in the user address management table in association with the identifier of the requesting user terminal; and terminal communication control means for replying, after executing a communication procedure for subscriber authentication with the user terminal, the IP address corresponding to the user terminal identifier shown by the user address management table in response to the IP address request packet received from the user terminal.

In an embodiment of the present invention, the inter-server communication control means requests the IP address to be allocated to the user terminal from the address pool management server in accordance with a server address specified by an authentication response received from the subscriber authentication server. In another embodiment of the present invention, the control unit has a server address table indicating a relationship between an identifier of the ISP network and an address of the address pool management server, and the inter-server communication control means refers to the server address table based on the ISP network identifier specified by the identifier of the user terminal and specifies the address of the address pool management server from which the IP address is to be requested.

One characteristic aspect of the packet forwarding apparatus according to the present invention resides in a structure that the control unit has an address pool management table for holding a plurality of IP addresses usable over the ISP network as the sub-address pool, searches the address pool management table for an IP address in an idle state when an authentication response instructing to use the sub-address pool was received from the subscriber authentication server, and stores the idle IP address in the user address management table when the IP address in the idle state was found, or acquires an IP address from the address pool management server through the inter-server communication control means when the IP address in the idle state was not found as a result of searching the address-pool management table.

Another characteristic aspect of the packet forwarding apparatus according to the present invention resides in that the control unit transmits, when a packet requesting disconnection from the Internet was received from the user terminal, a request packet for releasing the IP address allocated to the user terminal to the address pool management server through the inter-server communication control means.

Still another characteristic aspect of the packet forwarding apparatus according to the present invention resides in that the protocol processing unit has means for collecting account information of the user terminal connected to the Internet network, and the control unit collects, when a packet requesting disconnection from the Internet was received from the user terminal, the account information of the user terminal from the protocol processing unit and transmits an accounting stop request packet indicating the account information to the subscriber authentication server through the inter-server communication control means.

According to the present invention, an access network system, which is connected to an Internet service provider (ISP) network including a subscriber authentication server, is comprised of a plurality of packet forwarding apparatuses each for connecting a plurality of user terminals to an Internet network via the ISP network, and an address pool management server provided with an address pool management table for holding a plurality of IP addresses usable over the ISP network as a sub-address pool, wherein each of the packet forwarding apparatuses includes means for acquiring, when the subscriber authentication server has succeeded in authentication of a user terminal requesting connection to the Internet, an IP address to be allocated to the user terminal from the address pool management server.

More specifically, the access network system according to the present invention is characterized in that each of the packet forwarding apparatuses is comprised of a plurality of line interfaces each coupled to one of the user terminals or to the ISP network through connection lines, a control unit, and a protocol processing unit for exchanging received packets among the line interfaces and the control unit. The control unit is comprised of: a user address management table for storing a plurality of table entries each indicating a relationship between an identifier of one of the user terminals and an address allocated thereto; inter-server communication control means for transmitting to the address pool management server an authentication request for a user terminal having requested connection to the Internet, extracts, when a response packet to the authentication request was received from the address pool management server, an IP address to be allocated to the user terminal from the response packet, and stores the IP address in the user address management table in association with the identifier of the user terminal; and terminal communication control means for replying, after executing a communication procedure for subscriber authentication with the user terminal, the IP address corresponding to the user terminal identifier shown by the user address management table in response to an IP address request packet received from the user terminal. The address pool management server has inter-server communication control means for forwarding the authentication request received from the packet forwarding apparatus to the subscriber authentication server, searching the address pool management table for an idle one of the IP addresses when a response packet instructing to use the sub-address pool was received from the subscriber authentication server, and transmitting a response packet including the IP address to the packet forwarding apparatus.

On characteristic aspect of the access network system according to the present invention resides in that the protocol processing unit of each of the packet forwarding apparatuses has means for collecting account information of the user terminal connected to the internet network, the control unit collects the account information of the user terminal from the protocol processing when a packet requesting disconnection from the Internet was received from the user terminal and transmits an accounting stop request packet including the account information to the address pool management server, and the address pool management server forwards the accounting stop request packet to the subscriber authentication server.

Since the packet forwarding apparatus and the access network system according to the present invention are constituted such that the access server (packet forwarding apparatus) acquires an IP address to be allocated to the user terminal from the address pool management server provided in the access network, the plurality of access servers can share the sub-address pool managed by the address pool management server. This configuration allows a reduction in load on the subscriber authentication server connected to the ISP network and effective use of the address pool possessed by the ISP. This configuration also allows a reduction in a frequency of changing the range of the sub-address pool between the carrier managing the access network and the ISP.

BRIEF DESCRIPTION OF THE DRAWINGS

FIG. 2 is a block diagram showing an example of a structure of the packet forwarding apparatus according to the present invention;

FIG. 3 is a view showing a management server address table which is provided in the packet forwarding apparatus according to the present invention;

FIGS. 4A to 4D are views for illustrating an updating process for a user address table provided in the packet forwarding apparatus according to the present invention;

FIGS. 6A and 6B are views for illustrating an address pool management table provided in the address pool management server 1-1;

DETAILED DESCRIPTION OF THE PREFERRED EMBODIMENTS

Figure 1:
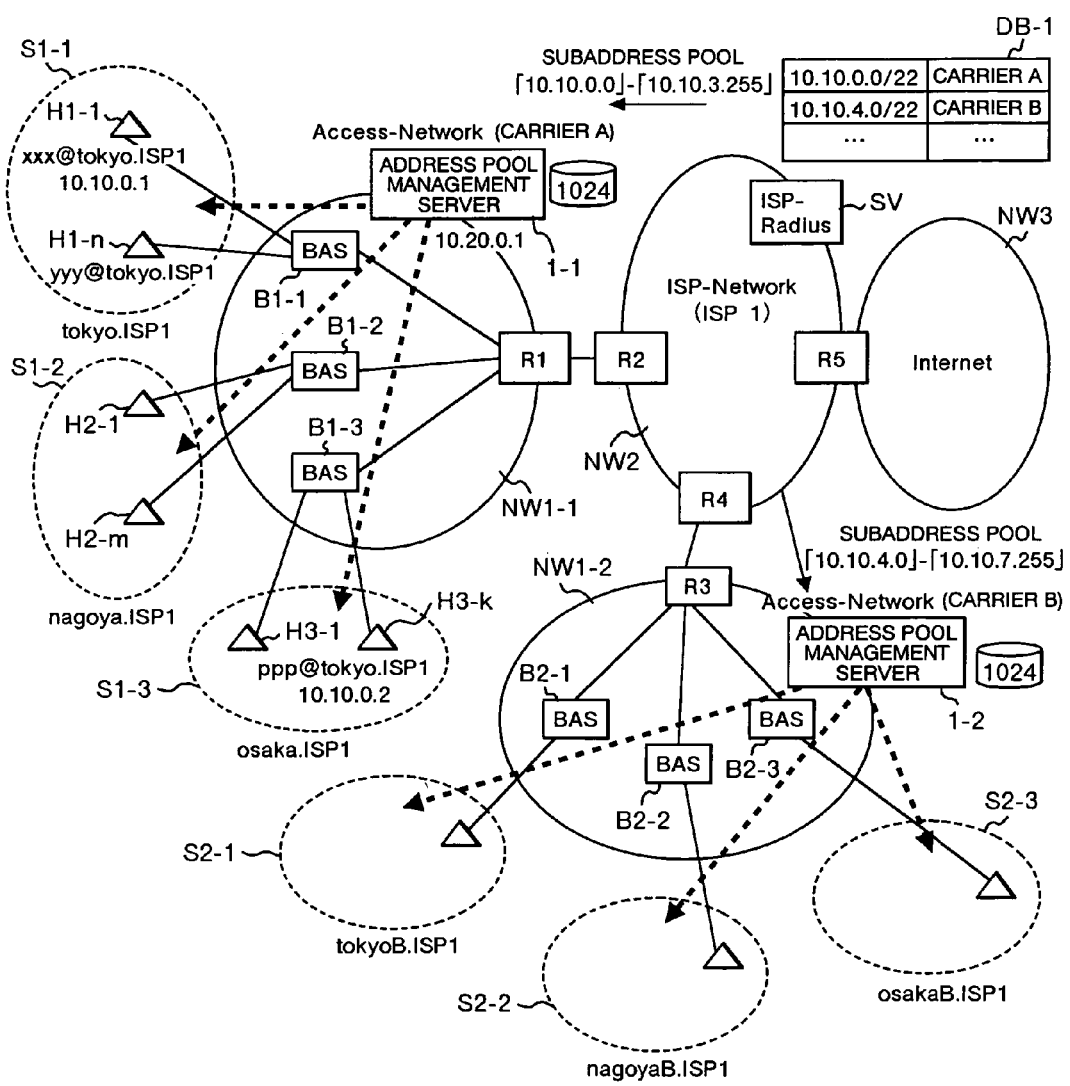
FIG. 1 is a view showing an example of a network structure to which a packet forwarding apparatus according to the present invention has been applied.

Referring to the drawings, the embodiments of the present invention will be described herein below.

FIG. 1 shows an example of a network structure to which a packet forwarding apparatus according to the present invention has been applied.

The network shown here is composed of access networks NW1 (NW1-1 and NW1-2) each provided by a carrier, an ISP network NW2 managed by an ISP, and the Internet NW3. These networks are connected through routers R1 to R5. To the ISP network NW2, a Radius (Remote Authentication Dial In User Service) server SV functioning as a subscriber authentication server is connected.

The access network NW1-1 includes packet forwarding apparatuses B1-$i$ ($i$=1 to 3) and an address pool management server 1-1. Each of the packet forwarding apparatus B1-$i$ accommodates a plurality of user terminal Hi-j (j=1 to n, 1 to m, and 1 to k) located in an area S1-$i$ and functions as an access server (BAS) for connecting these user terminals to the Internet NW3. Likewise, the access network server NW1-2 includes packet forwarding apparatuses B2-$i$ ($i$=1 to 3) and an address pool management server 1-2. Each of the packet forwarding apparatus B2-$i$ accommodates a plurality of user terminals located in an area S2-$i$ and functions as an access server to the Internet NW3.

Each of the packet forwarding apparatuses B1-$i$ ($i$=1 to 3) and the address pool management server 1-1 is managed by the carrier A of the access network NW1-1, while each of the packet forwarding apparatuses B2-$i$ ($i$=1 to 3) and the address pool management server 1-2 is managed by the carrier B of the access network NW1-2. Each of the address pool management servers 1-1 and 1-2 holds a group of addresses entrusted thereto by the Radius server SV as a sub-address pool and executes the allocation of IP addresses to user terminals and the status management of the IP addresses in place of the Radius server SV. In the example shown in the drawing, the address pool management server 1-1 has been entrusted by the Radius server SV with the application and management of the group of IP addresses "10.10.0.0" to "10.10.3.255", while the address pool management server 1-2 has been entrusted by the Radius server SV with the application and management of the group of IP addresses "10.10.4.0" to "10.10.7.255".

When a request for connection to the Internet is issued from a user terminal, each of the packet forwarding apparatuses B1-$i$ and B2-$i$ requests the transmission of a user ID and a password, each for user authentication, from the requesting user terminal, transmits an access request (authentication request) message including the user ID and the password that have been received from the user terminal to the Radius server SV located in the ISP network NW2, and determines whether the user terminal should be connected to the Internet based on a response from the Radius server SV.

The Radius server SV manages subscriber information including a password, an address, a name, a bank account number, and account data in association with the user ID. Upon receiving the access request message from the packet forwarding apparatus, the Radius server SV refers to the subscriber information based on the user ID shown by the received message, determines the authentication of the password shown by the received message, and returns a response message indicative of the result of the determination to the requesting packet forwarding apparatus. The Radius server SV also starts accounting management for each subscriber in accordance with an accounting request message from the packet forwarding apparatus. Communication between the Radius server SV and the packet forwarding apparatus is performed in accordance with the RADIUS protocol.

FIG. 2 is a block diagram showing a structure of the packet forwarding apparatus B1-1. Each of the other packet forwarding apparatuses B1-2 to B2-3 has the same structure as the packet forwarding apparatus B1-1.

The packet forwarding apparatus B1-1 according to the present invention is comprised of line interfaces 11-$i$ ($i=1$ to k) coupled to input/output lines LI-1 and LO-i ($i=1$ to k) connected to the user terminals or the router, a protocol processing unit 12 connected to these line interfaces, and a control unit 20 connected to the line interfaces 11-$i$ ($i=1$ to k) and to the protocol processing unit 12.

Each of the line interfaces 11-$i$ converts a signal received from the corresponding one of the input lines LI-i to a received packet, adds a port number to the received packet, forwards the received packet with the port number to the protocol processing unit 12, removes the port number that has become unnecessary from the packet received from the protocol processing unit 12, converts the received packet to a transmission signal, and sends the transmission signal to the corresponding one of the output lines LO-i. The protocol processing unit 12 fetches the received packet from each of the line interfaces, determines the destination port of the received packet based on header information, and forwards the received packet to the control unit 20 or to any of the line interfaces. The protocol processing unit 12 is provided with a routing table 13 and a statistics table 14 for storing account data, and determines the destination port of the received packet by referring to the routing table 13.

The control unit 20 is comprised of a processor 21, a program memory 22 for storing various programs to be executed by the processor 21, a data memory 23 for storing various tables to be referred to by the processor 21, and a control terminal interface 24 for connection to a control terminal 40 operated by a system administrator. The control unit 20 has the function of controlling the connection/disconnection of the user terminal to and from the Internet and exchanging control messages for controlling user authentication, the allocation of an IP address, and accounting with the Radius server SV and the address pool management server 1-1.

In the program memory 22, there are prepared, as programs related to the present invention to be executed by the processor 21, e.g., a connection control routine 30, a PPP LCP/NCP communication control routine 31 which exchanges control messages for the connection/disconnection with a user terminal, and a Radius communication control routine 32 for inter-server communication which exchanges control messages with subscriber authentication server (ISP-Radius server) SV and the address pool management server 1-1. It is to be noted that the address pool search routine 33 indicated by the broken line block is a routine pertaining to a third embodiment of the present invention, which will be described later.

In the data memory 23, there are prepared, as a table to which the present invention relates, a management server address table 34 indicating the address of the address pool management server from which the IP address to be allocated to the user terminal is requested, and a user address management table 35 for managing the use status of the IP addresses received from the address pool management server. It is to be noted that the address pool management table 35 indicated by the broken line block is a table pertaining to the third embodiment of the present invention, which will be described later.

FIG. 3 shows an example of the contents of the management server address table 34.

The management server address table 34 is composed of a plurality of entries each showing the correspondence between an ISP name 341 and an address pool management server address 342. The contents of the management server address table 34 are updated through the control terminal 40 by the system administrator.

For example, in the network shown in FIG. 1, the IP addresses to be distributed by the provider (ISP1) of the ISP network NW2 to subscriber terminals accommodated in the access network NW1-1 are managed by the address pool management server 1-1. Accordingly, the IP address "10.20.0.1" of the address pool management server 1-1 is registered as the address pool management server address 342 corresponding to the ISP name 341 "ISP1" in the management server address table 342 of each of the packet forwarding apparatuses B1-$i$ ($i=1$ to 3) located in the access network NW 1-1.

The packet forwarding apparatus B1-1 can request the distribution of IP addresses from the address pool management server 1-1 by referring to the management server address table 34 upon allocating the IP addresses to user terminals H1-1 to H1-$n$. In the case where an address pool management server to be communicated with is specified irrelevantly to the ISP name, a default entry specifying the IP address of the address pool management server may be registered appropriately in association with the ISP name 341 "Default".

FIGS. 4A to 4D show an example of the user address management table 35.

In the user address management table 35, a plurality of entries 350-1, 350-2, . . . each showing an IP address 353 to be allocated to a user terminal and a status 352 of the IP address 353 are registered in association with a user ID 351 used by a terminal user upon requesting connection to the Internet. In the present embodiment, the status 352 includes "requesting" indicative of the state in which the packet forwarding apparatus B1-1 is requesting the distribution of an IP address from the address pool management server, "waiting" indicative of the state in which the IP address has not been distributed yet to the requesting user terminal immediately after the reception of the IP address from the address pool management server, and "distributed" indicative of the state in which the IP address has already been distributed to the user terminal. FIGS. 4B to 4D show a status change in the entry 350-2 in the case where the terminal H1-$n$ has issued an Internet connection request under the user ID "yyy@tokyo.ISP1". An updating process for the user address management table 35 will be described later in detail.

Figure 5:
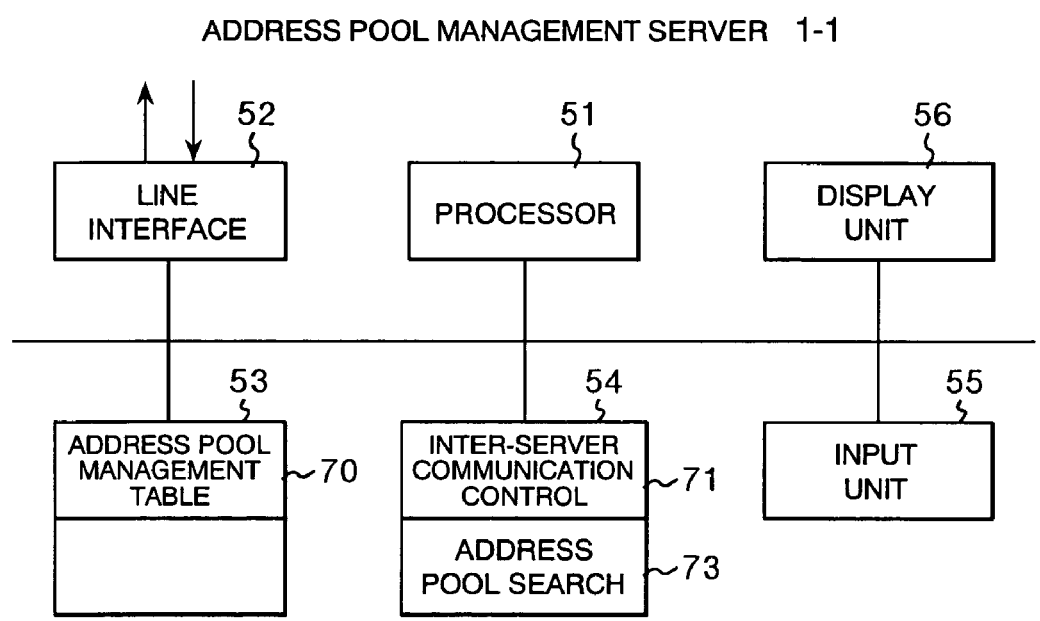
FIG. 5 is a block diagram showing an example of a structure of the address pool management server 1-1 of FIG. 1.

FIG. 5 is a block diagram showing a structure of the address pool management server 1-1 (1-2).

The address pool management server 1-1 is comprised of a processor 51, a line interface 52 to be connected to the access network NW1-1 (NW1-2), a data memory 53, a program memory 54, an input unit 55, and a display unit 56.

The line interface 52 converts a signal received from the input line of the access network NW1-1 to a received packet, forwards the received packet to the processor 51, converts a transmission packet output from the processor 51 to a transmission signal, and transmits the transmission signal to the output line of the access network NW 1-1.

In the data memory 53, an address pool management table 70 is prepared as a table to be referred to by the processor 51. In the program memory 54, an inter-server communication control routine 71 for exchanging control messages with the access servers B1-$i$ (i=1 to k) and an address pool search routine 73 are prepared as programs related to the present invention to be executed by the processor 51.

FIGS. 6A and 6B show an example of the address pool management table 70.

The address pool management table 70 defines the contents of the sub-address pool under each of domain names 701. The sub-address pool is composed of a plurality of entries each showing an item number 702, an IP address 703, and a destination 704.

On making a service contract with an ISP, the system administrator of each of carriers operating access networks is notified by the ISP of the range of IP addresses allocatable to user terminals. The system administrator constructs the sub-address pool of the address pool management table 70 based on the allocatable IP addresses obtained on making the contract.

For example, the case is assumed where the ISP1 instructs the carrier A to allocate an IP address within the range of "10.10.0.0" to "10.10.3.255" in response to an Internet connection request using a user ID including the domain name "ISP1". In this case, the subscriber authentication server (ISP-Radium server) of the ISP1 stores the relationship between the carrier A and the range of allocatable IP addresses in the table, as indicated by DB-1 in FIG. 1.

On the other hand, the address pool management server 1-1 of the carrier A registers, in the address pool management table 70, the entries of which the IP addresses 703 are "10.10.0.0" to "10.10.3.255" as the sub-address pool corresponding to the domain name 701 "ISP1". In the address pool management table 70, "inhibited" is stored in the destination 704 of an IP address that has preliminarily proved to be unallocatable to a terminal, while status information indicative of "idle" is stored in the destination 704 of each of the other IP addresses. It is also possible to divide the domain name 701 on an area-by-area basis, such as "Tokyo. ISP1" or "osaka. ISP1", so that the ISP can distribute the IP addresses in units of subdivided range.

In FIG. 6A, the IP address "10.10.0.52" is in the idle state, as indicated by the entry with the item number "52". FIG. 6B shows the status in which the IP address "10.10.0.52" has already been allocated to the user terminal H1-$n$ that has issued an Internet connection request by using the user ID "yyy@tokyo.ISP1". The allocation of an IP address to a user terminal will be described later in detail with reference to FIGS. 13 and 14.

Figure 7:
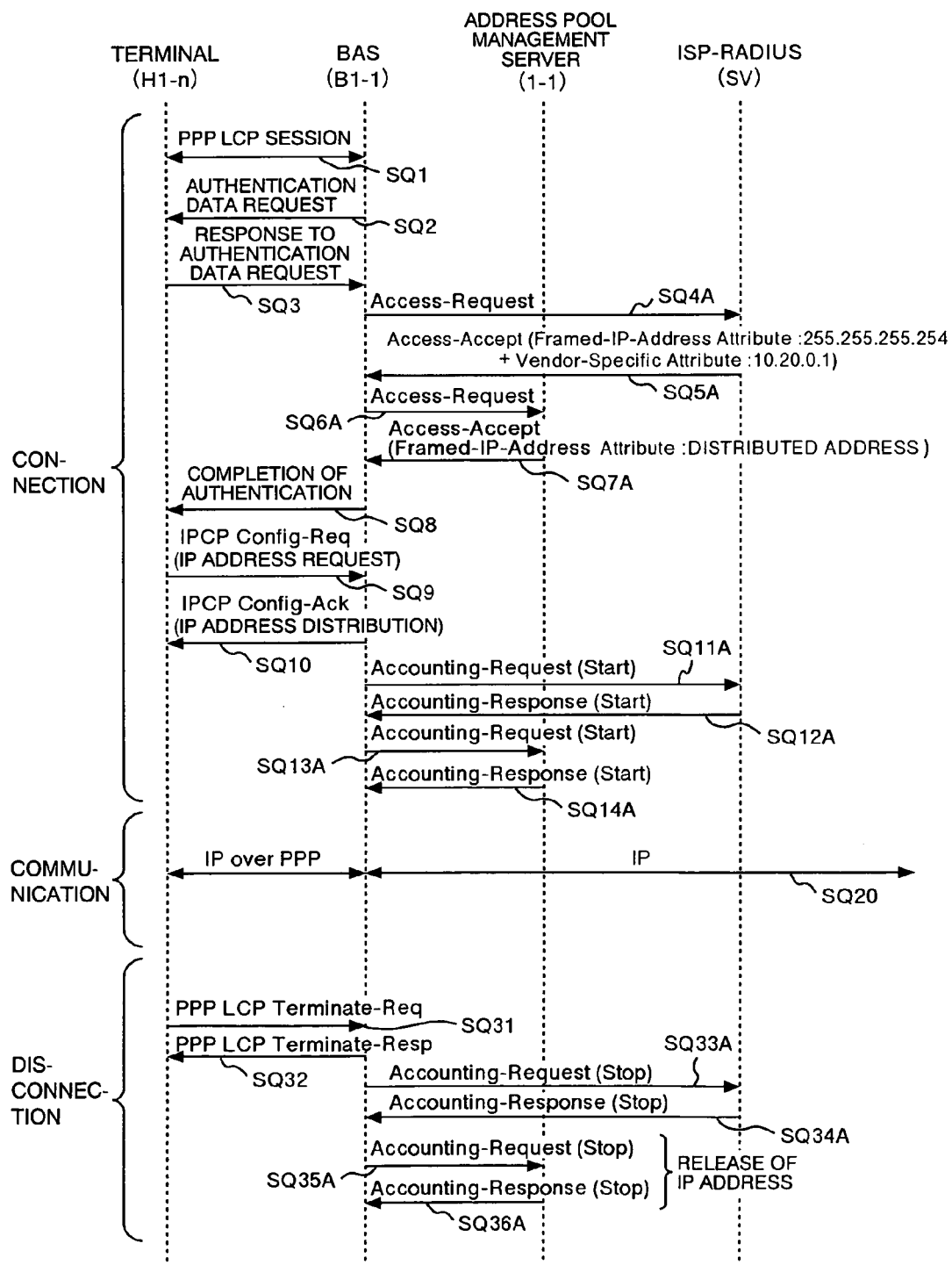
FIG. 7 is a sequence diagram showing a first embodiment pertaining to the allocation of an address to a user terminal by the packet forwarding apparatus according to the present invention.

By referring to a sequence diagram shown in FIG. 7, a description will be given to a first embodiment pertaining to the allocation of an IP address to a user terminal to be performed by the packet forwarding apparatus (BAS) B1-1 according to the present invention.

The description will be given here to the case where the user terminal H1-$n$ having the user ID "yyy@tokyo.ISP1" shown in FIG. 1 has issued an Internet connection request to the packet forwarding apparatus (BAS) B1-1 by using the PPP (Point to Point Protocol).

The user terminal H1-$n$ establishes a PPP LCP session with the packet forwarding apparatus B1-1 in accordance with a normal connection sequence in the PPP (Step SQ1). The PPP LCP session is established through the transmission of PPP LCP Configure-Request from the user terminal H1-$n$ to the packet forwarding apparatus B1-1 and the returning of PPP LCP Configure-Response from the packet forwarding apparatus B1-1 to the user terminal H1-$n$ in response to the request.

In order to determine whether the user terminal H1-$n$ is authorized to access the Internet, the packet forwarding apparatus B1-1 having established the PPP LCP session with the user terminal H1-$n$ transmits to the user terminal H1-$n$ an authentication data request message for requesting the transmission of a user ID and a password (SQ2). When the user terminal H1-$n$ transmits an authentication response message including the user ID "yyy@tokyo.ISP1" and a password in response to the request (SQ3), the packet forwarding apparatus B1-1 transmits an access request message (Access-Request) including the user ID and the password to the subscriber authentication server (Radius server) SV which is managed by the ISP 1 (SQ4A).

Upon receiving the access request message, the Radius server SV checks the password shown by the access request message based on the subscriber information registered preliminarily in association with the user ID "yyy@tokyo.ISP1" and returns an access response message indicative of the result of password authentication to the requesting packet forwarding apparatus B1-1 (SQ5A). When the password matches with the preliminarily registered password, the Radius server SV returns an access response message (Access-Accept) which enables connection between the user terminal H1-$n$ and the Internet.

Figure 8:
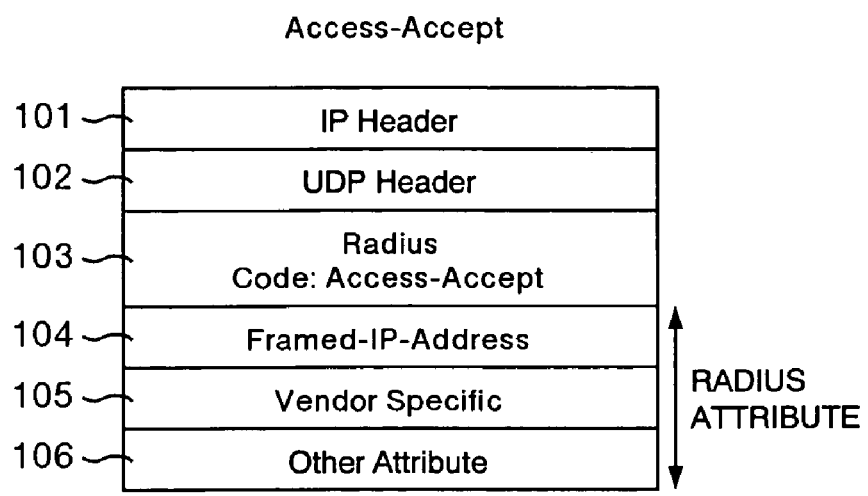
FIG. 8 is a view showing a format of a response packet to be transmitted from a subscriber authentication server (ISP-RADIUS) to a packet forwarding apparatus (BAS) in FIG. 7.

As shown in FIG. 8, the access response message (Access-Accept) mentioned above is transmitted in the form of an IP packet with an IP header 101 and a UDP header 102. The access response message includes, as Radius attributes subsequent to a Radius Code 103 indicative of the message type "Access-Accept", a Framed-IP-Address attribute 104 indicative of an IP address to be used by the user terminal H1-$n$, a Vendor-Specific attribute 105, and other attribute 106.

In the present embodiment, the Radius server SV sets a fixed value "255.255.255.254" to the Framed-IP-Address attribute 104 of the access response message and sets the IP address "10.20.0.1" of the address pool management server to the Vendor-Specific attribute 105. The fixed value "255.255.255.254" indicates that an idle IP address should be allocated to a user terminal from the sub-address pool of the access network. In the case where the IP address of the address pool management server has preliminarily been registered in the management server address table 34 of the packet forwarding apparatus B1-1, the contents of the Vendor-Specific attribute becomes unnecessary.

When the Framed-IP-Address attribute 104 of the access response message (Access-Accept) received from the Radius server SV has the fixed value "255.255.255.254", the packet forwarding apparatus B1-1 transmits a second access request message (Access-Request) including the user ID "yyy@Tokyo. ISP1" to the address pool management server 1-1 specified by the Vendor-Specific attribute 105 (or the management server address table 34) (SQ6A).

Upon receiving the access request message (Access-Request), the address pool management server 1-1 searches the address pool management table 703 for an IP address in the idle status to be allocated to the user ID "yyy@tokyo.ISP1" and transmits a response message (Access-Accept) indicative of the IP address to the requesting packet forwarding apparatus B1-1 (SQ7A). At this time, as shown in FIG. 6B, the user ID is registered in the destination 704 corresponding to the allocated IP address in the address pool management table 703 and the status of the IP address changes from the idle status to an in-use status.

The response message (Access-Accept) transmitted by the address pool management server 1-1 has a format obtained by omitting the Vendor-Specific attribute 105 from the message format of FIG. 8. In the case where, e.g., the IP address "10.10.0.52" is allocated to the user ID "yyy@tokyo.ISP1", the IP address value "10.10.0.52" is set to the Framed-IP-Address attribute 104.

Upon receiving the response message (Access-Accept) from the address pool management server 1-1, the packet forwarding apparatus B1-1 judges from the Framed-IP-Address attribute 104 that the IP address to be allocated to the user terminal H1-n is "10.10.0.52". In this case, the packet forwarding apparatus B1-1 sets "10.10.0.52" to the distributed address 353 of the table entry 350-2 having the user ID "yyy@tokyo.ISP1" in the user address management table 35 shown in FIG. 4B, and changes the status 352 to "waiting" as shown in FIG. 4C. After that, the packet forwarding apparatus B1-1 transmits an authentication complete message to the user terminal H1-n (SQ8). By the transmission of the authentication complete message, the PPP LCP communication sequence is completed and a PPP NCP communication sequence starts.

Upon receiving the authentication complete message, the user terminal H1-n transmits an IP address allocation request (IPCP Configure-Request) to the packet forwarding apparatus B1-1 (SQ9). The packet forwarding apparatus B1-1 generates, in response to the IP address allocation request, an IP address distribution message (IPCP Configure-Ack) including the IP address "10.10.0.52" having been stored in the entry 2150-2 of the user address table and transmits the IP address distribution message to the user terminal H1-n (SQ10).

At this time, the packet forwarding apparatus B1-1 changes the status 352 of the entry 350-2 in the user address management table 35 to "distributed" as shown in FIG. 4D and thereby completes the allocation of the IP address to the user terminal H1-n. Thereafter, the packet forwarding apparatus B1-1 transmits an accounting start message (Accounting-Request (Start)) for requesting the start of accounting on the user terminal H1-n to the Radius server SV (SQ11A).

Figure 9:
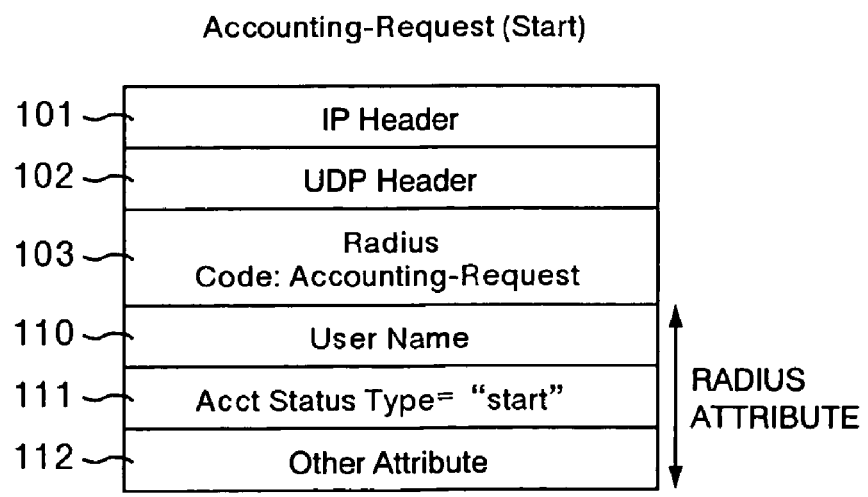
FIG. 9 is a view showing a format of an accounting start request packet to be transmitted from the packet forwarding apparatus (BAS) to the subscriber authentication server (ISP-RADIUS) in FIG. 7.

As shown in FIG. 9, the accounting start request message mentioned above includes, e.g., a User-Name attribute 110, an Acct-Status-Type attribute 111, and the other attribute 112 as Radius attributes subsequent to a Radius Code 103 indicative of the message type "Accounting-Request". In the case of the present embodiment, the user ID "yyy@tokyo.ISP1" is set to the User-Name attribute 110, while "Start" indicative of the start of accounting is set to the Acct-Status-Type attribute 111.

The Radius server SV returns, in response to the accounting start request message, an accounting start response message (Accounting-Response) (SQ12A). Upon receiving the accounting start response message form the Radius server SV, the packet forwarding apparatus B1-1 starts the operation of collecting account statistics data by the protocol processing unit 12, and transmits an accounting start request message (Accounting-Request (Start)) for the user terminal H1-n to the address pool management server 1-1 (SQ13A).

Upon receiving the accounting start request message, the address pool management server 1-1 returns an accounting start response message ((Accounting-Response (Start)) to the packet forwarding apparatus B1-1 (SQ14A). Upon receiving the accounting start response message from the address pool management server 1-1, the packet forwarding apparatus B1-1 starts the operation of forwarding Internet access packets (IP over PPP) received from the user terminal H1-n (SQ20).

A description will be given next to an Internet disconnection sequence.

In the case of disconnection from the Internet, the user terminal H1-n transmits a disconnect request message (PPP ICP Terminate-Request) for requesting the disconnection of the PPP LCP session to the packet forwarding apparatus B1-1 (SQ31). Upon receiving the disconnect request, the packet forwarding apparatus B1-1 returns a response message (PPP LCP Terminate-Response) to the user terminal H1-n (SQ32). Thereafter, the packet forwarding apparatus B1-1 transmits an accounting stop request message (Accounting-Request (Stop)) for requesting to stop the accounting process for the user ID "yyy@tokyo.ISP1" to the Radius server SV (SQ33A). The accounting stop request message includes the accounting statistics data of the user terminal H1-n collected by the protocol processing unit 12.

In response to the reception of the accounting stop request message, the Radius server SV terminates the accounting process for the user ID "yyy@tokyo.ISP1" and then returns an accounting stop response message (Accounting-Response (Stop)) to the packet forwarding apparatus B1-1 (SQ34A).

Upon receiving the accounting stop response message, the packet forwarding apparatus B1-1 deletes the entry 350-2 having "yyy@tokyo.ISP1" in the user ID field 351 from the user address management table 35 and transmits an accounting stop request message (Accounting-Request (Stop)) for requesting to stop the accounting process for the user ID "yyy@tokyo.ISP1" to the address pool management server 1-1 (SQ35A). In the accounting stop request message, the Acct-Status-Type attribute 111 is "Stop" indicative of the stop of accounting in the format shown in FIG. 9.

By receiving the accounting stop request message, the address pool management server 1-1 judges that the IP address allocated to the user ID "yyy@tokyo.ISP1" shown by the User-Name attribute 110 has been released. The address pool management server 1-1 then searches the address pool management table 70 for an entry in which the user ID "yyy@tokyo.ISP1" has been set as a destination 704, changes the destination 704 to the "idle" status, thereby to release the IP address "10.10.0.52" of the entry as an idle address. When the process of releasing the IP address is completed, the address pool management server 1-1 returns an accounting stop response message (Accounting-Response (Stop)) to the packet forwarding apparatus B1-1 (SQ36A).

Figure 10:
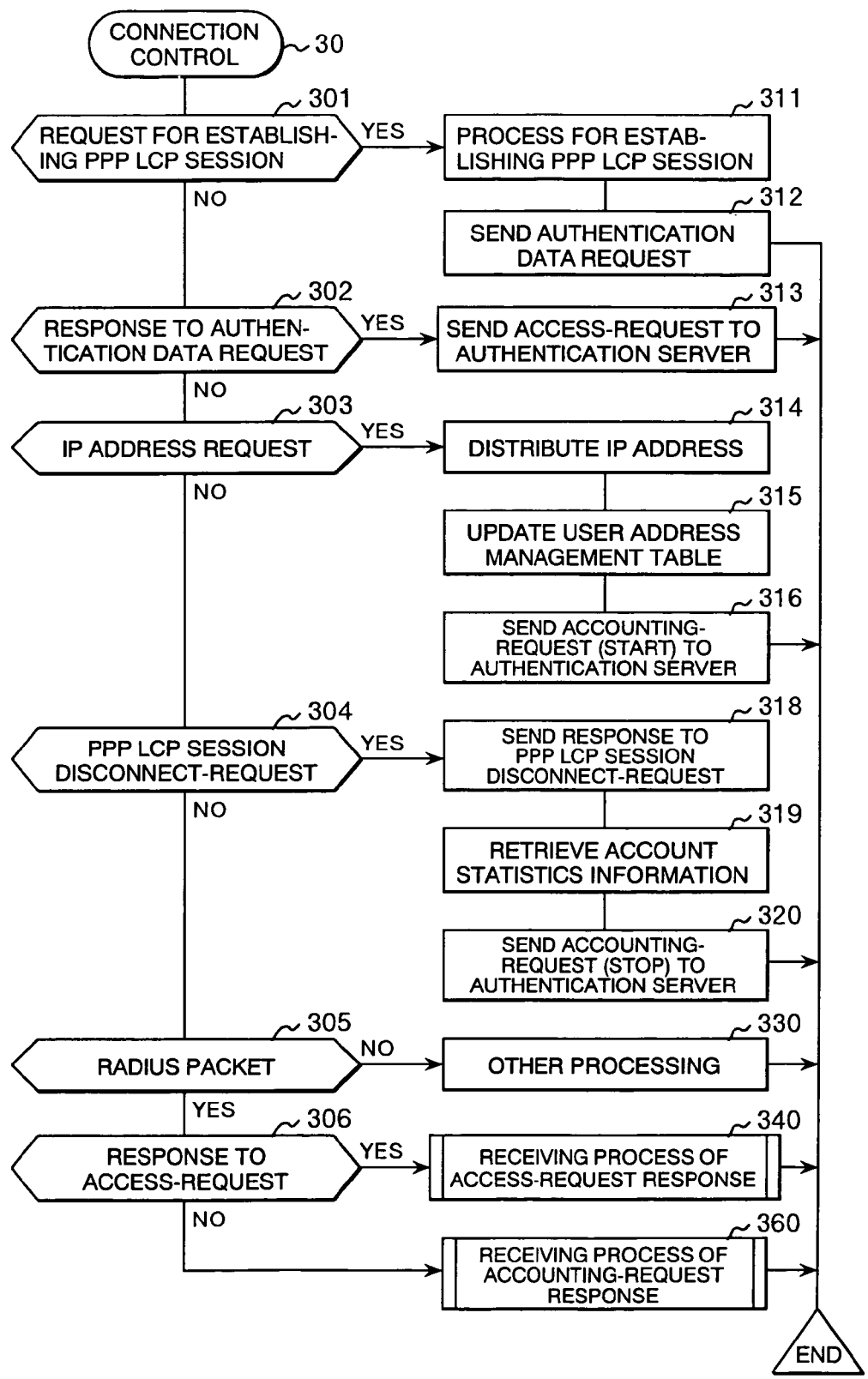
FIG. 10 is a flowchart showing an embodiment of a connection control routine 22 to be executed in the packet forwarding apparatus according to the present invention.

FIG. 10 shows a flowchart for the connection control routine 30 to be executed by the processor 21 of the packet forwarding apparatus B1-1 to implement the communication sequence described above.

The protocol processing unit 12 of the packet forwarding apparatus B1-1 forwards, out of the packets received from the line interfaces 11-i (i=1 to k), the PPP control packet and the IP packet each of which includes the IP address of the packet forwarding apparatus B1-1 as its destination address to the processor 21 of the control unit 20. The other received packets are forwarded in accordance with the routing table 13 to any of the line interfaces corresponding to the destination IP addresses.

Upon receiving a packet from the protocol processing unit 12, the processor 21 of the control unit 20 executes an operation responding to the received packet in accordance with the connection control routine 30 shown in FIG. 10.

Specifically, when the received packet is a packet for requesting PPP LCP connection from a user terminal (YES in Step 301), the processor 21 executes a predetermined process for PPP LCP connection in accordance with the PPP LCP/NCP communication control routine 31 (311), transmits an authentication data request message to the requesting user terminal (312), and terminates the routine.

When the received packet is a response packet transmitted from a user terminal in response to the authentication data request (YES in Step 302), the processor 21 transmits an access request message (Access-Request) to the subscriber authentication server SV in accordance with the Radius communication control routine 32 (313), and terminates the routine.

When the received packet is an IP address request (IPCP Configure-Req) transmitted from a user terminal (YES in Step 303), the processor 21 reads out an IP address from the user address management table 35 and transmits an IP address distribution message indicative of the IP address to the requesting user terminal in accordance with the PPP LCP/NCP communication control routine 31 (314). Thereafter, the processor 21 updates the status field 352 of the user address management table 35 so as to be "distributed" (315), transmits an accounting request message (Accounting-Request (Start)) to the subscriber authentication server SV in accordance with the Radius communication control routine 32 (316), and terminates the routine.

When the received packet is a PPP LCP terminate request packet transmitted from a user terminal (YES in Step 304), the processor 21 transmits a PPP LCP terminate request response to the requesting user terminal in accordance with the PPP LCP/NCP communication control routine 31 (318). Thereafter, the processor 21 collects the account statistics information of the user terminal from the protocol processing unit 12 (319), transmits an accounting stop request message (Accounting-Request (Stop)) including the account statistics information to the subscriber authentication server SV in accordance with the Radius communication control routine 32 (320), and terminates the routine.

In the case where the received packet is a Radius packet (YES in Step 305), if it is an access request response packet (YES in Step 306), the processor 21 executes a receiving process 340 of access-request response, which will be described in detail with reference to FIG. 11. If not, the processor 21 executes a receiving process 360 of accounting-request response, which will be described in detail with reference to FIG. 12, and terminates the routine. When the received packet does not correspond to any of the above-mentioned packets (NO in Step 305), the processor 21 executes the other process 330, and terminates the routine.

Figure 11:
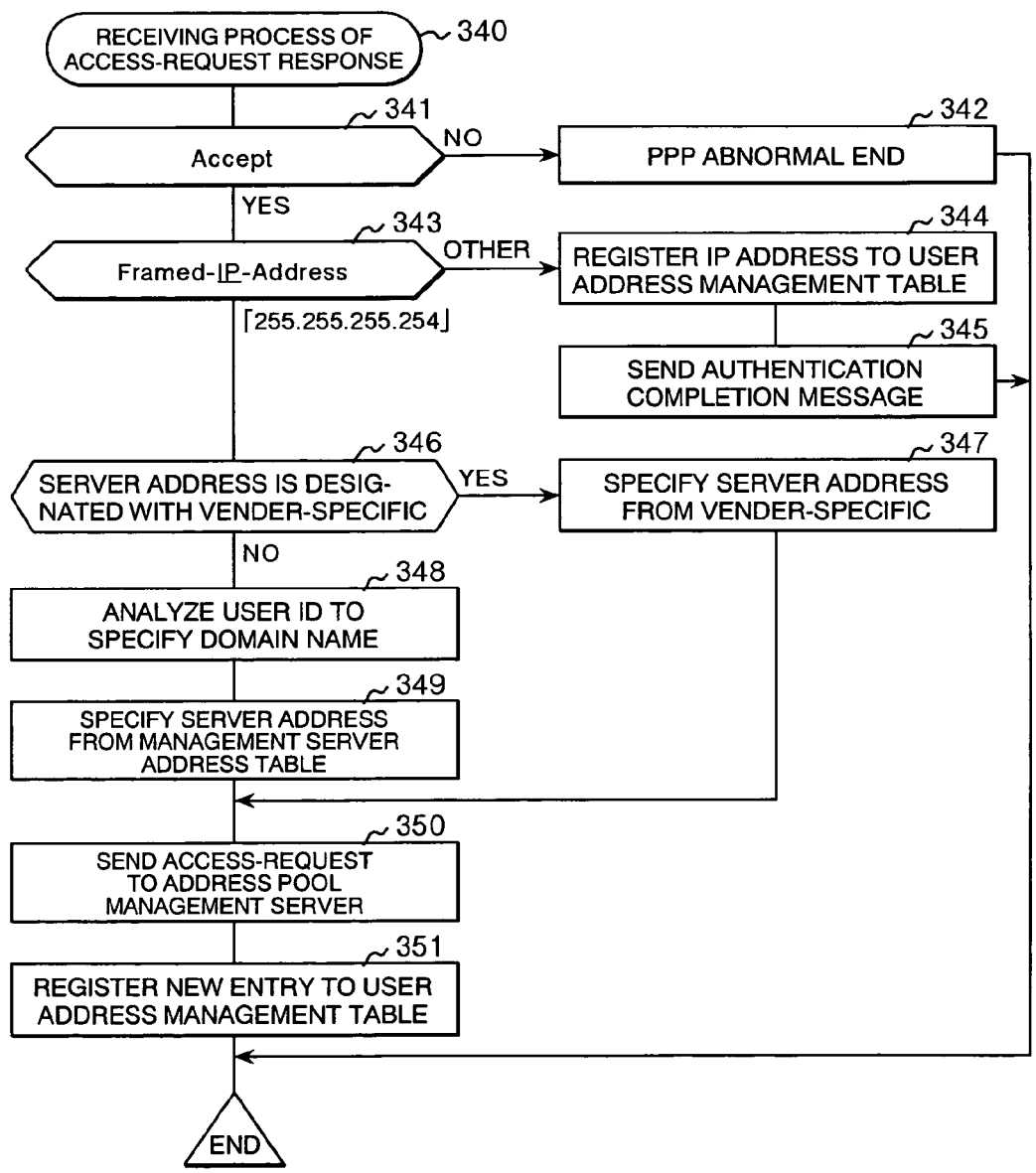
FIG. 11 is a flowchart showing in detail a receiving process 340 of access-request response in FIG. 10.

FIG. 11 is a flowchart showing in detail the receiving process 340 of access-request response.

In the receiving process 340 of access-request response, the processor 21 determines whether the received packet is an Access-Accept packet indicative of successful user authentication (341). If the received packet is not an Access-Accept packet, the processor 21 executes a PPP abnormality ending process (342), thereby terminating the routine.

When the received packet is an Access-Accept packet, the processor 21 checks the Framed-IP-Address attribute (343). If the Framed-IP-Address attribute indicates a normal IP address, the processor 21 registers the IP address as the distributed address 353 in the entry of the user address management table 35 corresponding to the user ID of the requesting terminal (344), transmits an authentication complete message to the requesting user terminal (345) in accordance with the PPP LCP/NCP communication control routine 31, and terminates the routine.

When the Framed-IP-Address attribute of the received packet indicates the fixed value "255.255.255.254", the processor 21 checks the Vendor-Specific attribute of the received packet (346). If a server address has been specified by the Vendor-Specific attribute, the processor 21 judges the server address as the address of an address pool management server from which the IP address is to be requested (347) and transmits an access request (Access-Request) to the address pool management server specified by the server address (450). Thereafter, the processor 21 registers a table entry corresponding to an authentication target user ID included in the received packet in the user address management table 35 (351), and terminates the routine.

When the server address has not been specified by the Vendor-Specific attribute, the processor 21 specifies the domain name by analyzing the authentication target user ID extracted from the received packet (348) and specifies the address of an address pool management server corresponding to the domain name (ISP name) from the management server address table 34 (349). Thereafter, the processor 21 transmits an access request (Access-Request) to the address pool management server specified by the server address in accordance with the Radius communication control routine 32 (450), registers a table entry corresponding to the authentication target user ID in the user address management table (351), and terminates the routine.

Figure 12:
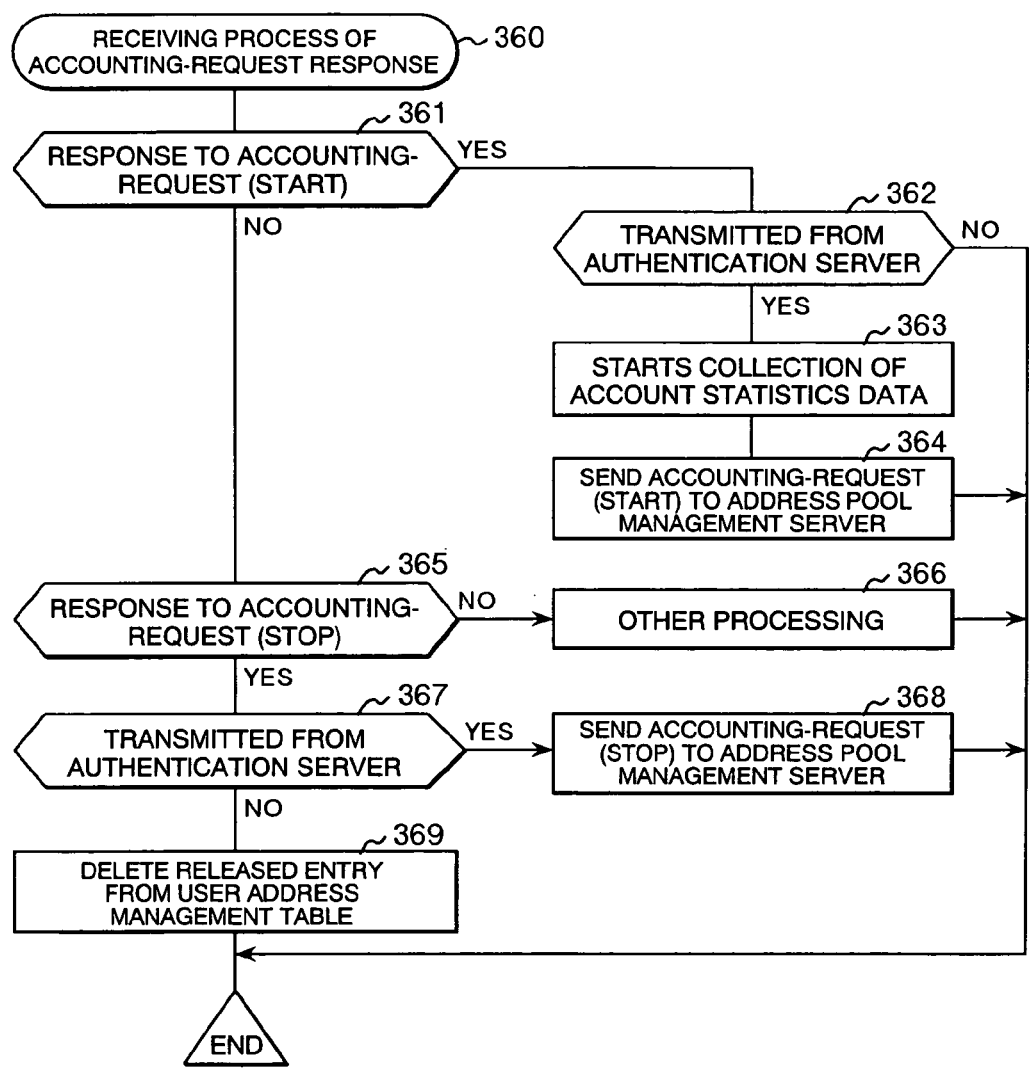
FIG. 12 is a flowchart showing in detail a receiving process 360 of accounting-request response in FIG. 10.

FIG. 12 is a flowchart showing in detail the receiving process 360 of accounting-request response 360.

In the receiving process 360 of accounting-request response, the processor 21 determines whether the received packet is a response packet to an accounting start request (361). When the received packet is the response packet to the accounting start request, the processor 21 determines the transmitter of the received packet (362). If the transmitter is not a subscriber authentication server, the process is terminated. If the transmitter is the subscriber authentication server, the processor 21 instructs the protocol processing unit 12 to start the collection of account statistics data for IP packets having the allocated IP address (363), transmits an accounting start request to the address pool management server in accordance with the Radius communication control routine 32 (364), and terminates the process.

When the received packet is not the response packet to the accounting start request, the processor 21 determines whether the received packet is a response packet to an accounting stop request (365). If the received packet is the accounting stop request response packet, the processor 21 determines the transmitter of the received packet (367). When the transmitter of the received packet is the subscriber authentication server, the processor 21 transmits an accounting stop request to the address pool management server in accordance with the Radius communication control routine 32 (368), and terminates the process. When the transmitter of the received packet is not the subscriber authentication server, i.e., when the transmitter of the received packet is the address pool management server, the processor 21 deletes a table entry corresponding to the user ID which is an accounting target from the user address management table 35 (369), and terminates the process.

Figure 13:
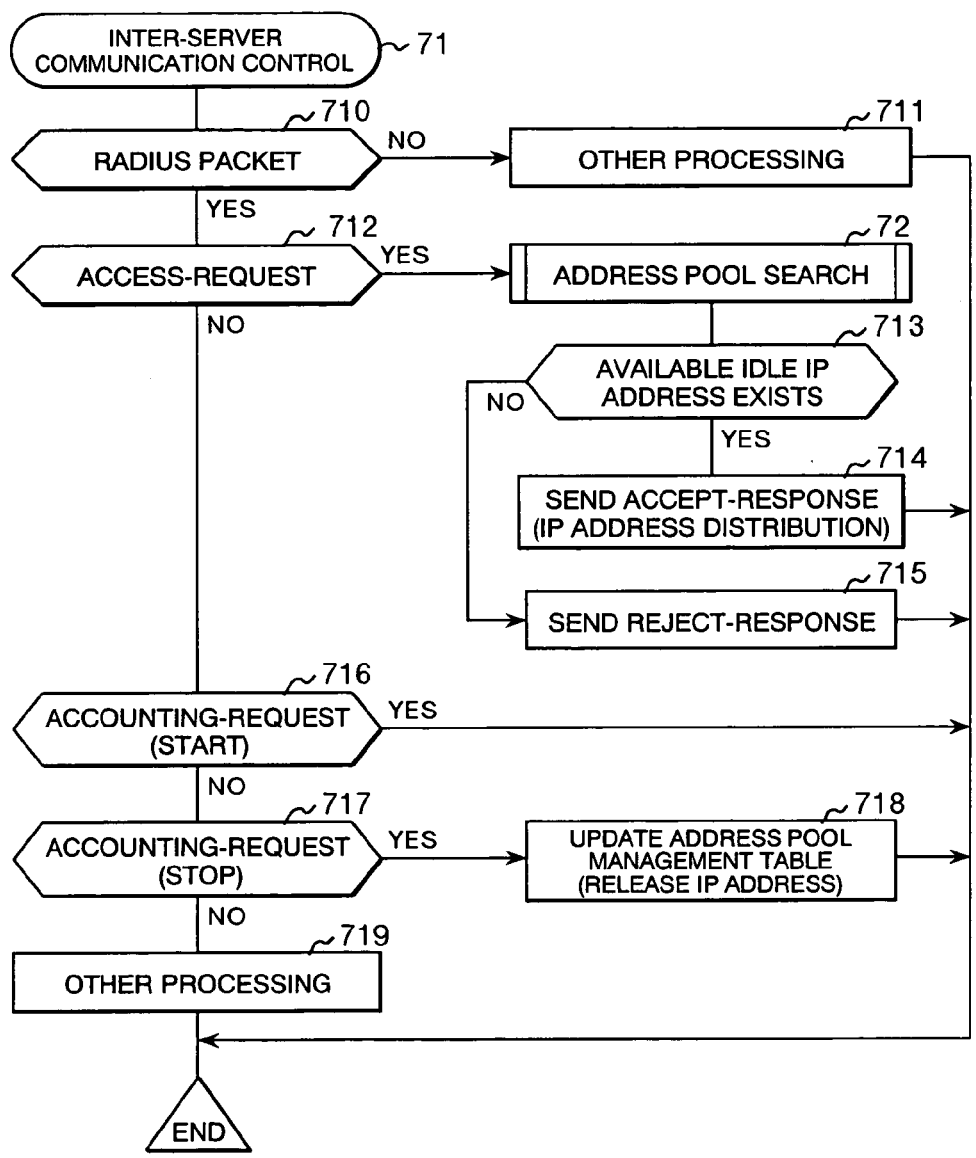
FIG. 13 is a flowchart showing an embodiment of an inter-server communication control routine 71 to be executed by an address pool management server.

FIG. 13 shows a flowchart for the inter-server communication control routine 73 to be executed by the processor 51 of the address pool management server 1-1. In the case of the present embodiment, the communication partners of the address pool management server 1-1 are the access servers B1-1 to B1-3, and the Radius protocol is used for inter-server communication. Accordingly, each of the packets transmitted and received in accordance with the inter-server communication control routine 73 includes a Radius message in principle.

Upon receiving a packet from the line interface 52, the processor 51 executes the inter-server communication control routine 71 to determine first whether the received packet is a Radius packet (710). When the received packet is not a Radius packet, the processor 51 executes the other process 711, and terminates the routine.

When the received packet is a Radius packet, the processor 51 determines from the message type (Radius Code) of the received packet whether the received packet is an access request packet (Access-Request) (712). If the received packet is an access request packet, the processor 51 executes the address pool search routine 72 to search the address pool management table 70 for an idle IP address to be allocated to a user terminal. When an idle IP address to be allocated to the user terminal is found as a result of searching (713), the processor 51 transmits a response packet (Access-Accept) including the IP address to the requesting access server (714), and terminates the routine. The response packet has a format that omits the Vendor-Specific attribute 105 from that shown in FIG. 8 and includes the value of the IP address to be allocated to the user terminal, e.g., "10.10.0.52" in the Framed-IP-Address attribute 104.

If there is no idle IP address in the address pool management table 70, the processor 51 transmits a response packet (Access-Reject) indicative of failure to satisfy the access request to the requesting access server (715), and terminates the routine.

When the received packet is not an access request packet, the processor 51 determines whether the received packet is an accounting start request packet (716) and terminates the routine without performing anything if the received packet is an accounting start request packet. If the received packet is not an accounting start request packet, the processor 51 determines whether the received packet is an accounting stop request packet (717). When the received packet is an accounting stop request packet, the processor 51 searches the address pool management table 70 for an entry including the user ID of an accounting stop target in the destination 704 and replaces the user ID of the entry with the idle state (718). When the received packet is other than the accounting stop request packet, the processor 51 executes the other process 719, and terminates the routine.

Figure 14:
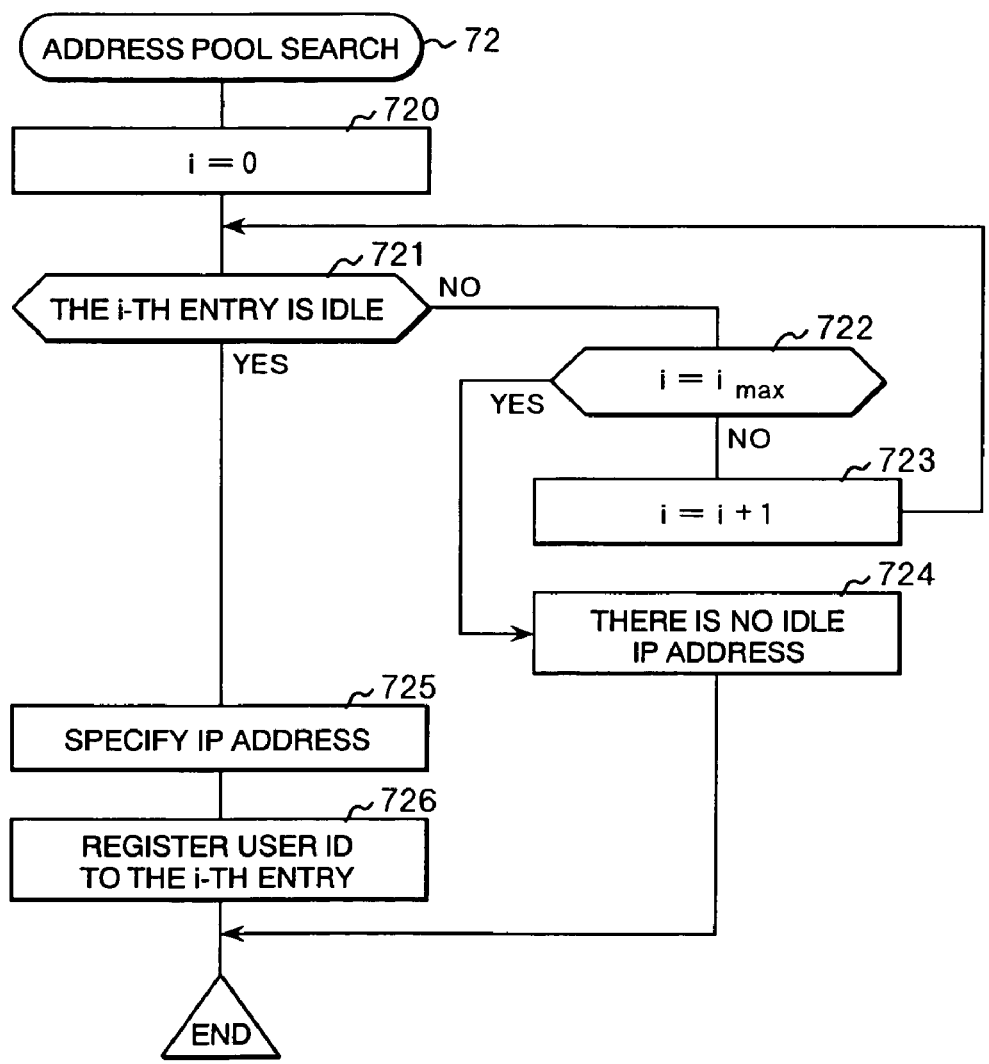
FIG. 14 is a flowchart showing an embodiment of an address pool search routine 72 to be executed at the address pool management server.

FIG. 14 shows a detailed flowchart of the address pool search routine 72.

The flowchart shown here is a searching flow to search the sub-address pool registered in the address pool management table 70 in association with, e.g., the domain name "ISP1" for an idle IP address successively from the entry with the item number "1".

The processor 51 first sets the initial value 0 to a parameter i for specifying the target entry to be checked in the sub-address pool (720) and checks the destination 704 in the i-th entry of the sub-address pool (721). When it is judged from the value of the destination 704 that the i-th entry is not an idle entry, the processor 51 determines whether the value of the parameter i has reached the number imax (which is 1023 in the example of FIG. 6) of the entries registered in the sub-address pool (722). If the value of the parameter i has not reached the number imax, the processor 51 increments the value of the parameter i (723), returns to Step 721, and determines the status of the destination 704 of the next entry.

When the i-th entry is an idle entry, the processor 51 specifies the value of the IP address 703 shown by the entry as an IP address to be allocated to a user terminal (725), registers the user terminal ID of the IP address requester as the destination 704 in the i-th entry of the sub-address pool (726), and terminates the routine. When the value of the parameter i has reached the number imax, i.e., when there is no entry in the idle state in the address pool, the processor. 51 issues "no idle IP address" as a result of searching (724), and terminates the routine.

In the example shown in FIG. 6A, since an entry in the idle state is found when the value of the parameter i becomes "52", the value "yyy@tokyo.ISP1" of the user terminal ID is registered in the 52nd entry as shown in FIG. 6B, whereby the address pool search is completed.

Although the value of the parameter i is initialized every time the address pool management table is searched in the above flowchart, it is also possible to start, when a new authentication request is issued, a table search by using the value of the parameter i at the end of the previous search as an initial value to shorten the table search time. In this case, when the IP address of the final entry in the address pool is judged to be in use, the value of the parameter i will be returned from the number imax to 0 so that the searching of the address pool for an entry having an idle IP address is continued successively from the first entry.

The parameter i at the start of the table search may be stored appropriately to allow the comparison of the parameter i with the stored value (initial value) every time the value of the parameter i is updated in order to detect that the value of the parameter i returns to the item number of the entry where the table search started after going once around the address pool without finding any idle IP address. Otherwise, it is also possible to count the number n of entries that have already been judged and make a judgment of no idle IP address when the counted value n coincides with the number imax of the entries registered in the address pool.

Figure 15:
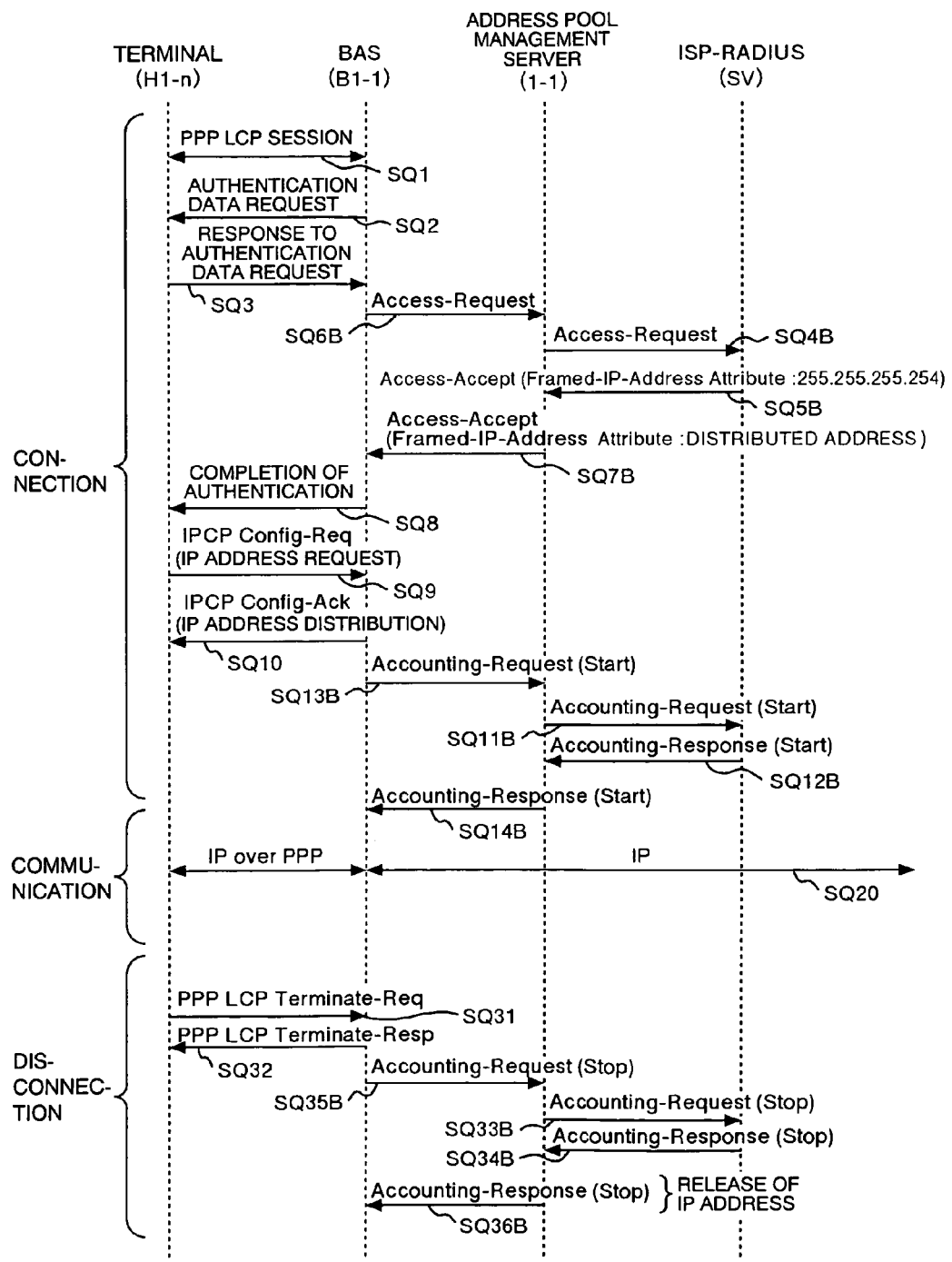
FIG. 15 is a sequence diagram showing a second embodiment pertaining to the allocation of an address to a user terminal by the packet forwarding apparatus according to the present invention.

FIG. 15 is a sequence diagram showing a second embodiment of the allocation of an IP address to a user terminal performed by the packet forwarding apparatus (BAS) according to the present invention. A description will be given here in the case where the user terminal H1-*n* having the user ID. "yyy@tokyo.ISP1" requests connection to the Internet by using PPP, similarly to the case shown in FIG. 7. The feature of the second embodiment resides in that the address pool management server 1-1 receives an access request for user authentication from the packet forwarding apparatus, as a substitute apparatus for the subscriber authentication server (Radius server) SV.

In the same manner as in the first embodiment, the user terminal H1-*n* establishes a PPP LCP session with the packet forwarding apparatus B1-1 (Step SQ1) and transmits a response message (SQ3) in response to the reception (SQ2) of an authentication data request from the packet forwarding apparatus B1-1.

In the second embodiment, the packet forwarding apparatus B1-1 having received the response message to the authentication data request transmits an access request (authentication request) message (Access-Request) including the user ID "yyy@tokyo.ISP1" and a password each shown by the response message to the address pool management server 1-1 which is the substitute for the subscriber authentication server (Radius server) SV (SQ6B) The transmission of the access request message to the address pool management server 1-1 is realized by applying the IP address "10.20.0.1" of the address pool management server 1-1 in place of the Radius server address when the administrator of the packet forwarding apparatus B1-1 specifies the Radius server address for the packet forwarding apparatus B1-1.

Upon receiving the access request message, the address pool management server 1-1 forwards the access request message to the Radius server SV (SQ4B). Upon receiving the address request message, the Radius server SV extracts the user ID "yyy@tokyo.ISP1" and the password from the received message and checks the authentication of the password based on the subscriber information preliminarily registered in association with the user ID "yyy@tokyo.ISP1".

When the password is authenticated, the Radius server SV returns the access response message (Access-Accept) shown in FIG. 8 to the address pool management server 1-1 (SQ5B). To the Framed-IP-Address attribute 104 of the access response message, the fixed value "255.255.255.254" indicating that an IP address should be allocated to the user terminal H1-n from the sub-address pool of the access network is set in the same manner as in the first embodiment. In the second embodiment, it is no more necessary to specify the IP address of the address pool management server 1-1 with the Vendor-Specific attribute 105.

The address pool management server 1-1 having received the access response message searches the address pool management table 70 shown in FIG. 6 for an idle IP address to be allocated to the user terminal H1-n, e.g., "10.10.0.52" in accordance with the address pool search routine described with reference to FIG. 14 because the Framed-IP-Address attribute of the received message indicates the fixed value "255.255.255.254" and transmits an access response message (Access-Accept) specifying the IP address "10.10.0.52" with the Framed-IP-Address attribute to the packet forwarding apparatus B1-1 (SQ7B).

The packet forwarding apparatus B1-1 having received the access response message sets the allocated IP address "10.10.0.52" to the table entry 350-2 having the user ID "yyy@tokyo.ISP1" in the user address management table 35 and transmits an authentication complete message to the user terminal H1-n in the same manner as in the first embodiment (SQ8).

The user terminal H1-n having received the authentication complete message transmits an IP address allocation request (IPCP Configure-Rec) to the packet forwarding apparatus B1-1 (SQ9). The packet forwarding apparatus B1-1 returns an IP address distribution message (IPCP Configure-Ack) including the IP address "10.10.0.52" to the user terminal H1-n in response to the IP address allocation request (SQ10), whereby the allocation of the IP address to the user terminal H1-n is completed.

When the allocation of the IP address to the user terminal H1-n has been completed, the packet forwarding apparatus B1-1 generates an accounting start request message (Accounting-Request (Start)) for the user terminal H1-n (the user ID "yyy@tokyo.ISP1") and transmits the accounting start request message to the address pool management server 1-1 which is the substitute for the Radius Server SV (SQ13B). The address pool management server 1-1 forwards the accounting start request message received from the packet forwarding apparatus B1-1 to the Radius server SV (SQ11B).

Upon receiving the accounting start request message, the Radius server SV starts an accounting process with respect to communication performed by the user ID "yyy@tokyo.ISP1" and returns an accounting start response message (Accounting-Response) to the address pool management server 1 (SQ12B). The address pool management server 1-1 forwards the accounting start response message received from the Radius server SV to the packet forwarding apparatus B1-1 (SQ14B). Upon receiving the accounting start response message from the address pool management server 1-1, the packet forwarding apparatus B1-1 instructs the protocol processing unit 12 to start the collection of account statistics data for the received packets having the IP address "10.10.0.52" and starts the forwarding operation of Internet access packets (IP over PPP) transmitted by the user terminal H1-n (SQ20).

When the user terminal H1-n disconnects from the Internet, the user terminal H1-n transmits a terminate request message (PPP LCP Terminate-Request) for requesting the termination of the PPP LCP session to the packet forwarding apparatus B1-1 (SQ31). Upon receiving the terminate request, the packet forwarding apparatus B1-1 returns a response message (PPP LCP Terminate-response) to the user terminal H1-n (SQ32), instructs the protocol processing unit 12 to stop the accounting process, and collects the account statistics data. Thereafter, the packet forwarding apparatus B1-1 generates an accounting stop request message (Accounting-Request (Stop)) including the account statistics data of the user ID "yyy@tokyo.ISP1", and transmits the generated message to the address pool management server 1-1 (SQ35B).

The address pool management server 1-1 forwards the accounting stop request message (Accounting-Request (Stop)) to the Radius server SV (SQ33B). In response to the reception of the accounting stop request message, the Radius server SV stops the accounting process for the user ID "yyy@tokyo.ISP1" and returns an accounting stop response message (Accounting-Request) to the address pool management server 1-1 (SQ34B).

Upon receiving the accounting stop response message, the address pool management server 1-1 searches the address pool management table 70 for an entry in which the user ID "yyy@tokyo.ISP1" has been set to the destination field 704 and releases the IP address "10.10.0.52" of the entry by changing the destination field 704 to the "idle" state. When the process of releasing the IP address is completed, the address pool management server 1-1 returns an accounting stop response message (Accounting-Response) to the packet forwarding apparatus B1-1 (SQ36B). Upon receiving the accounting stop response message, the packet forwarding apparatus B1-1 deletes an entry 2150-2 including "yyy@tokyo.ISP1" in its user ID field 2151 from the user address table 215.

Although the access pool management server 1-1 has been located in the access network NW-1 and each of the packet forwarding apparatus B1-1 to B1-3 has acquired the IP address to be allocated to the user terminal from the address pool management server 1-1 in each of the first and second embodiments, it is also possible to impart the function of the access pool management server to any of the packet forwarding apparatuses B1-1 to B1-3 such that the other packet forwarding apparatuses acquire IP addresses from the packet forwarding apparatus having the access pool managing function.

Figure 16:
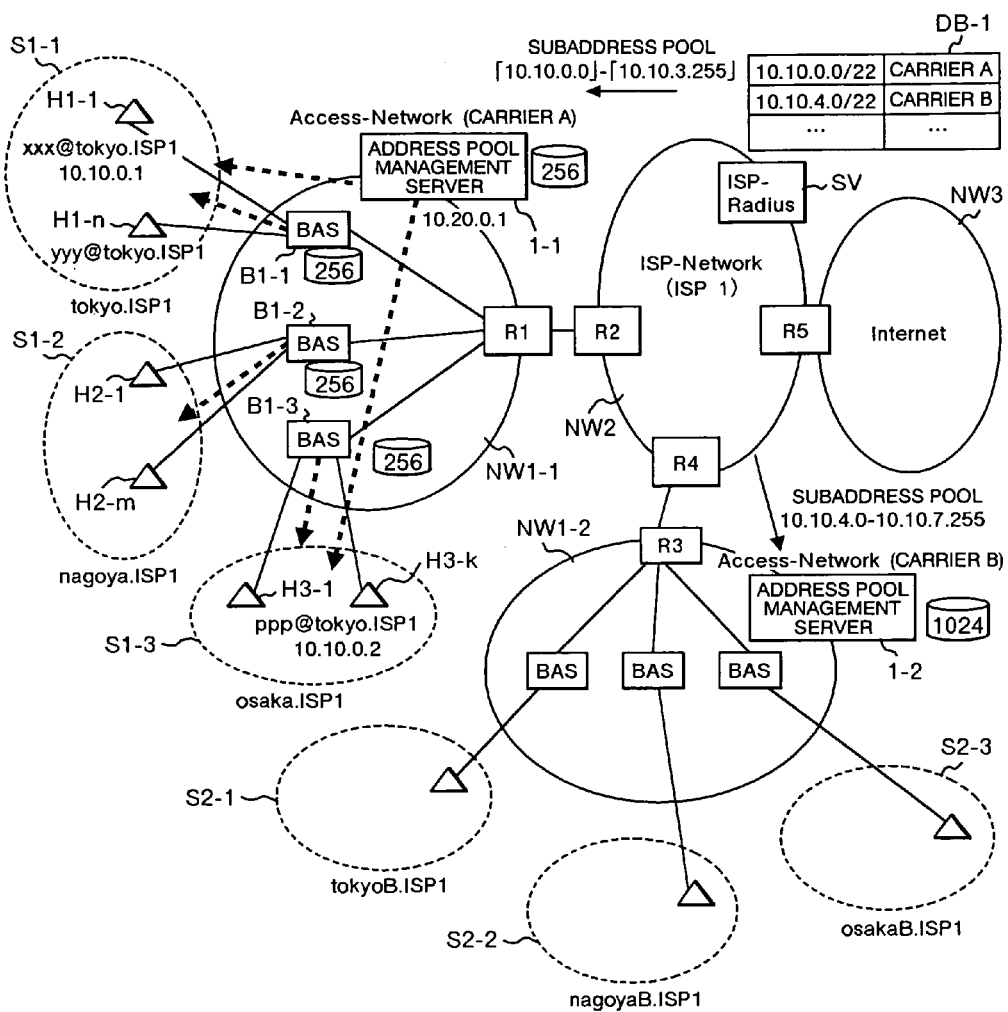
FIG. 16 is a network structural view for illustrating a third embodiment of the packet forwarding apparatus according to the present invention.

FIG. 16 shows, as a third embodiment of the present invention, a network structure in which each of the plurality of packet forwarding apparatuses B1-1 to B1-3 belonging to the access network NW1-1 is provided with a sub-address pool such that each of the packet forwarding apparatus allocates an IP address to each of the user terminals from the sub-address pool of its own when there exists an idle IP address in the sub-address pool and acquires a new IP address to be allocated to the user terminal from the address pool management server 1-1 when the sub-address pool has no idle IP address.

Each of the packet forwarding apparatuses B1-1 to B1-3 used in the present embodiment includes the address pool search routine 33 and the address pool management table 36, each shown by the broken line block in FIG. 2. The address pool management table 36 is composed of the same entries as those of the table shown in FIG. 6 which is provided in the address pool management server.

It is assumed here the case where, under the Internet connection service contract between the ISP1 and the carrier A managing the access network NW1-1, the ISP1 entrusts the 1024 IP addresses "10.10.0.0" to "10.10.3.255" to the carrier A similarly to the first embodiment. The carrier A registers 256 IP addresses as the sub-address pool in the address pool management table 36 provided in each of the packet forwarding apparatuses B1-1, B1-2, and B1-3 located in the access network NW1-1, while registering 256 IP addresses as the sub-address pool in the address pool management table 70 provided in the address pool management server 1.

In the third embodiment, each of the packet forwarding apparatuses B1-$i$ (i=1 to 3) selects an idle IP address from the address pool management table 36 of its own and allocates the selected IP address to the user terminal Hi-j (j=n, m, or k) located in the area S1-$i$ on connecting the user terminal Hi-j to the Internet. The searching of the address pool management table 36 for an idle IP address and the status management of the destination 704 in each of the table entries are performed in accordance with the address pool management routine 33. If the number of Internet connection requests from user terminals in the area S1-$i$ increases and idle IP addresses are exhausted in the sub-address pool of the packet forwarding apparatus B1-$i$, the packet forwarding apparatus B1-$i$ acquires an idle IP address from the address pool management server 1-1 and allocates the acquired IP address to the user terminal.

Specifically, when the Framed-IP-Address attribute of the access request response message received from the subscriber authentication server indicates the fixed value "255.255.255.254" in the receiving process 340 of access-request response described with reference to FIG. 11 (YES in Step 343), the packet forwarding apparatus according to the third embodiment searches the address pool management table 36 for an idle address in accordance with the address pool search routine 33. If an idle address is found, the control sequence advances to Step 351 where the IP address is registered in the user address management table. If there is no idle address, Steps 346 to 350 are executed.

According to the third embodiment, since each of the packet forwarding apparatus B1-$i$ can independently allocate an IP address to a user terminal when the number of Internet connection requests occurring in temporally overlapping relation in the area S1-$i$ is 256 or less, the Internet connection service is provided more swiftly. When the number of Internet connection requests exceeds 256 and idle IP addresses are exhausted in the sub-address pool of any of the packet forwarding apparatus B1-$i$, the packet forwarding apparatus B1-$i$ is allowed to acquire an idle IP address from the address pool management server 1-1 so that the Internet connection service can be provided to 512 user terminals at the maximum.

Although the sub-address pool of each of the address pool management server 1-1 and the packet forwarding apparatus B1-$i$ has the same capacity (the same number of IP addresses) in the above description, the sub-address pools of the packet forwarding apparatus may have capacities different from one area to another. To effectively use the limited number of IP addresses entrusted to the carrier A by circumventing the situation in which the sub-address pool of the address pool management server 1-1 comes short of idle IP addresses irrespective of idle IP addresses remaining in a specified one of the packet forwarding apparatus, the number of IP addresses registered in the sub-address pool provided in the address pool management server 1-1 maybe increased appropriately by reducing the total number of IP addresses allocated to the sub-address pools provided in the packet forwarding apparatuses B1-1 to B1-3.

Although each of the foregoing embodiments has used the Radius protocol for communication between the packet forwarding apparatus and the access pool management server, another protocol may also be used instead. Although each of the foregoing embodiments has used the IPv4 (Internet Protocol version 4) for communication packets among the packet forwarding apparatuses, the access pool management server, and the subscriber authentication server, the IPv6 (Internet Protocol version 6) may also be used instead. In the case of using the IPv6, the Framed-IP-Address attribute 104 shown in FIG. 8 is replaced with a Framed-IPv6-Prefix attribute.

What is claimed is:

1. A packet forwarding apparatus, which is located in an access network connected to an Internet service provider (ISP) network including a subscriber authentication server, for connecting a plurality of user terminals to an Internet network via said ISP network, the packet forwarding apparatus comprising:

a plurality of line interfaces each coupled to one of said user terminals or to said ISP network through connection lines;

a control unit; and a protocol processing unit for exchanging received packets among said line interfaces and said control unit, wherein said control unit includes:

a user address management table for storing a plurality of table entries each indicating a relationship between an identifier of one of said user terminals and an IP address allocated thereto, inter-server communication control means for executing, for a user terminal having requested connection to the Internet, an authentication procedure between the user terminal and said subscriber authentication server, requesting an Internet Protocol (IP) address to be allocated to the user terminal from an address pool management server located in said access network when an authentication response packet instructing to use a sub-address pool was received from said subscriber authentication server, and storing the IP address acquired from the address pool management server in said user address management table in association with an identifier of the user terminal, and terminal communication control means for replying, after executing a communication procedure for subscriber authentication with the user terminal, the IP address corresponding to the identifier of the user terminal shown by said user address management table in response to the IP address request packet received from the user terminal.

2. The packet forwarding apparatus according to claim 1, wherein said inter-server communication control means requests the IP address to be allocated to the user terminal from said address pool management server in accordance with a server address specified by an authentication response received from said subscriber authentication server.

3. The packet forwarding apparatus according to claim 1, wherein said control unit has a server address table indicating a relationship between an identifier of said ISP network and an address of the address pool management server, and wherein said inter-server communication control means refers to said server address table based on the ISP network identifier specified by the identifier of the user terminal and specifies the address of the address pool management server from which said IP address is to be requested.

4. The packet forwarding apparatus according to claim 1, wherein said control unit has an address pool management table for holding a plurality of IP addresses usable over said ISP network as the sub-address pool, searches said address pool management table for an IP address in an idle state when an authentication response instructing to use the sub-address pool was received from said subscriber authentication server, and stores the idle IP address in said user address management table when the IP address in the idle state was found, or acquires an IP address from said address pool management server through said inter-server communication control means when the IP address in the idle state was not found as a result of searching said address pool management table.

5. The packet forwarding apparatus according to claim 1, wherein said control unit transmits, when a packet requesting disconnection from the Internet was received from one of the user terminals, a request packet for releasing the IP address allocated to the one user terminal to said address pool management server through said inter-server communication control means.

6. The packet forwarding apparatus according to claim 1, wherein said protocol processing unit has means for collecting account information of the user terminal connected to said Internet network, and
wherein said control unit collects, when a packet requesting disconnection from the Internet was received from the user terminal, the account information for the user terminal from said protocol processing unit and transmits an accounting stop request packet including the account information to said subscriber authentication server through said inter-server communication control means.

7. An access network system connected to an Internet service provider (ISP) network including a subscriber authentication server, said access network system comprising:
a plurality of packet forwarding apparatuses each for connecting a plurality of user terminals to an Internet network via said ISP network; and
an address pool management server provided with an address pool management table for holding a plurality of Internet Protocol (IP) addresses usable over said ISP network as a sub-address pool,
wherein each of said packet forwarding apparatuses includes means for acquiring, when said subscriber authentication server has succeeded in authentication of a user terminal requesting connection to the Internet, an IP address to be allocated to the user terminal from said address pool management server,
wherein each of said packet forwarding apparatus is comprised of:
a plurality of line interfaces each coupled to one of said user terminals or to said ISP network through connection lines,
a control unit, and
a protocol processing unit for exchanging received packets among said line interfaces and said control unit,
wherein said control unit includes:
a user address management table for storing a plurality of table entries each indicating a relationship between an identifier of one of said user terminals and an address allocated thereto,
inter-server communication control means for transmitting to said address pool management server an authentication request for a user terminal having requested connection to the Internet, extracts, when a response packet to said authentication request was received from said address pool management server, an IP address to be allocated to the user terminal from the response packet, and stores the IP address in said user address management table in association with an identifier of the user terminal, and
terminal communication control means for replying, after executing a communication procedure for subscriber authentication with the user terminal, the IP address corresponding to the user terminal identifier shown by said user address management table in response to the IP address request packet received from the user terminal, and
wherein said address pool management server includes inter-server communication control means for forwarding said authentication request received from said packet forwarding apparatus to said subscriber authentication server, searching said address pool management table for an idle one of the IP addresses when a response packet instructing to use the sub-address pool was received from said subscriber authentication server, and transmitting a response packet including the IP address to said packet forwarding apparatus.

8. The access network system according to claim 7, wherein the protocol processing unit of each of said packet forwarding apparatuses has means for collecting account information of the user terminal connected to said internet network,
wherein said control unit collects the account information of the user terminal from said protocol processing when a packet requesting disconnection from the Internet was received from said user terminal and transmits an accounting stop request packet including the account information to said address pool management server, and
wherein said address pool management server forwards the accounting stop request packet to said subscriber authentication server.

9. The access network system according to claim 8, wherein said address pool management server returns the IP address corresponding to the user terminal identifier shown by said user address management table to an idle state when a response packet to said accounting stop request packet was received from said subscriber authentication server.

* * * * *